US008044630B2

(12) United States Patent
Ramus

(10) Patent No.: US 8,044,630 B2
(45) Date of Patent: Oct. 25, 2011

(54) DEVICE OF RADIOELECTRIC SIGNALS TRANSMITTER AND/OR RECEIVER TYPE

(75) Inventor: Michel Ramus, Amancy (FR)

(73) Assignee: Somfy SAS, Cluses (FR)

( * ) Notice: Subject to any disclaimer, the term of this patent is extended or adjusted under 35 U.S.C. 154(b) by 394 days.

(21) Appl. No.: 12/421,237

(22) Filed: Apr. 9, 2009

(65) Prior Publication Data

US 2009/0258606 A1 Oct. 15, 2009

(30) Foreign Application Priority Data

Apr. 10, 2008 (FR) ..................................... 08 01971

(51) Int. Cl.
*H02B 1/20* (2006.01)

(52) U.S. Cl. .......................................... 318/611; 363/46

(58) Field of Classification Search ............... 455/426.2, 455/462; 363/40-48; 318/611

See application file for complete search history.

(56) References Cited

U.S. PATENT DOCUMENTS

| | | | | |
|---|---|---|---|---|
| 2,581,983 | A | 1/1952 | Thompson | |
| 3,290,601 | A | 12/1966 | Pinizzotto et al. | |
| 4,194,178 | A | 3/1980 | Dumbeck | |
| 4,507,646 | A | 3/1985 | Hamlin et al. | |
| 5,808,430 | A * | 9/1998 | Ho | 318/266 |
| 6,104,920 | A | 8/2000 | Llewellyn et al. | |
| 6,151,228 | A * | 11/2000 | Miyazaki et al. | 363/48 |
| 6,998,962 | B2 * | 2/2006 | Cope et al. | 370/351 |
| 7,151,464 | B2 | 12/2006 | Ramus | |
| 7,498,895 | B2 * | 3/2009 | Hashimoto et al. | 333/12 |
| 7,948,195 | B2 * | 5/2011 | Grehant | 318/466 |
| 7,957,166 | B2 * | 6/2011 | Schnetzka et al. | 363/56.03 |
| 2002/0126037 | A1 * | 9/2002 | Fitzgibbon | 341/176 |
| 2006/0035650 | A1 * | 2/2006 | Amberny et al. | 455/462 |
| 2009/0225528 | A1 * | 9/2009 | Bergman et al. | 361/814 |
| 2010/0033889 | A1 * | 2/2010 | Pennington et al. | 361/111 |
| 2011/0090719 | A1 * | 4/2011 | Benjamin | 363/34 |
| 2011/0128087 | A1 * | 6/2011 | Chikando et al. | 333/17.1 |
| 2011/0141774 | A1 * | 6/2011 | Kane et al. | 363/37 |

FOREIGN PATENT DOCUMENTS

| | | | |
|---|---|---|---|
| EP | 0 718 908 | A | 6/1996 |
| GB | 702525 | | 1/1954 |
| WO | WO 83/01877 | A | 5/1983 |
| WO | WO 02/097230 | A | 12/2002 |

OTHER PUBLICATIONS

Search Report issued by French Patent Office for priority French application FR 0801971 dated Oct. 20, 2008.

* cited by examiner

*Primary Examiner* — Thomas J Hiltunen

(74) *Attorney, Agent, or Firm* — Frommer Lawrence & Haug LLP; Ronald R Santucci

(57) ABSTRACT

Radiofrequency device (30; 30'; 30"; 30'") controlling means for supplying at least one electrical load (14, 14') and comprising a radiofrequency unit (11) of radiofrequency signals transmitter and/or receiver type and connected by a first conductor (**9*b*) to the AC mains (9), wherein the radiofrequency unit comprises a radiofrequency signal output and/or input (20) connected by an HF link (19) to a first terminal (21) of a tuning circuit (17; 17'**) of the radiofrequency device, this tuning circuit being:

connected by a second terminal (22) to the first conductor, connected by a third terminal (23) to an electrical ground (GND) of the radiofrequency unit, furnished with means (L1, C1; L2, C3, C4) for blocking the conduction of radiofrequency signals on the first conductor between the second terminal and the third terminal, and traversed between the second terminal and the third terminal by the AC current (I-ACT) flowing in the first conductor and supplying said electrical load.

14 Claims, 3 Drawing Sheets

Fig. 1
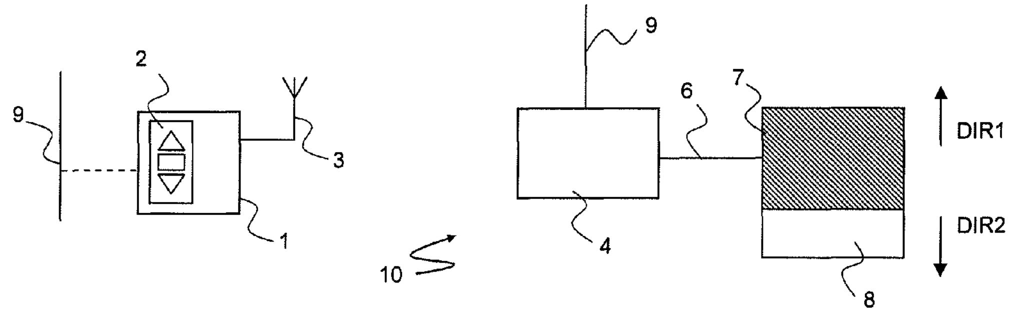
Fig. 2
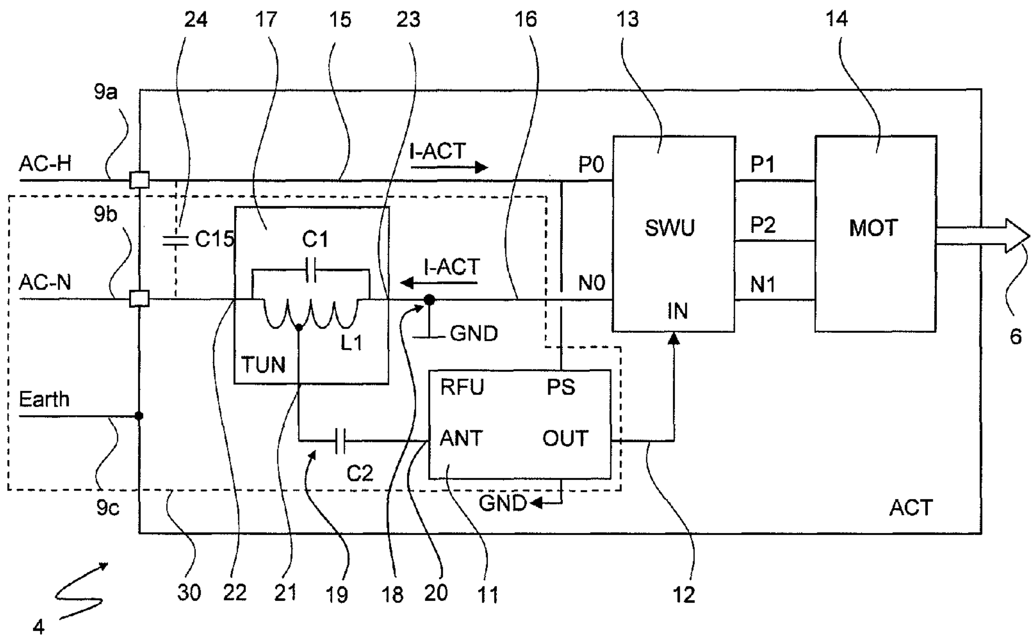
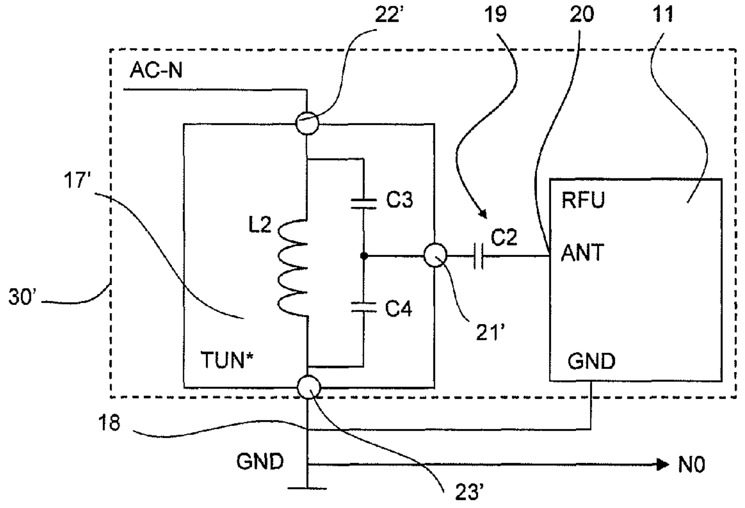
Fig. 3

DEVICE OF RADIOELECTRIC SIGNALS TRANSMITTER AND/OR RECEIVER TYPE

This application claims priority benefits from French Patent Application No. FR 0801971 filed Apr. 10, 2008, the disclosure of which is hereby incorporated by reference.

BACKGROUND OF THE INVENTION

The invention relates to the field of remote control using radiofrequencies, that is to say via radioelectric signals, of the actuators controlling an electrical load in a building, this electrical load being intended for thermal, visual or luminous comfort, for solar protection, for closing or securing the building or its environs.

Such actuators comprise a radiofrequency receiver equipped with a receiving antenna, making it possible to increase the sensitivity thereof and therefore the transmission range between the radiofrequency receiver and a nomad or fixed radiofrequency transmitter.

The receiving antenna is a sensitive and fragile element. Moreover, the actuator is often arranged in a metal casing which makes it necessary to locate the antenna outside the casing in order to preserve sensitivity.

The use of the electrical power supply cable of the actuator to accommodate a part of the antenna, or to use a phase conductor and/or a neutral conductor as antenna, either by a direct coupling, or by a partial coupling has long been contemplated.

DESCRIPTION OF THE PRIOR ART

U.S. Pat. No. 2,581,983 and U.S. Pat. No. 3,290,601 describe such a coupling, with a connection point on each of the conductors of the mains cable situated a predetermined distance (⅛ to ¼ of a wavelength) away from an electrical ground of the receiver setup. These patents also describe a frequency tuning circuit and a mains power supply circuit for the receiver. The two circuits, tuning and power supply, are totally separate.

U.S. Pat. No. 4,507,646 also describes the use of a capacitive coupling with the mains, this time for a radiofrequency transmitter. This time also, the two circuits, tuning and power supply, are totally separate.

Patent GB 702,525 describes an inductive coupling with the mains power supply cable of a television, this cable being furnished with coils on each end so as to strictly limit the antenna effect to the length of the cable.

U.S. Pat. No. 4,194,178 describes a method of sending information using the mains cable, by carrier currents, in the case of the monitoring of an electric motor. The two circuits, energy coupling and signal coupling, are totally separate.

In the Applicant's U.S. Pat. No. 7,151,464, a non-galvanic coupling is effected between an antenna, preferably a quarter wave antenna, and the mains conductors, so as to allow simultaneous transmission directly and by mains coupling. Preferably, the coupling takes place in a rectilinear manner, thereby requiring a length of about 10 cm at 433 MHz and possibly posing bulkiness problems.

In U.S. Pat. No. 6,104,920, relating to a portable telephone with base mount, the radiofrequency radiator is constituted not by the mains cable itself, but by a portion of a continuous power supply cable lying between a mains adaptor, comprising a transformer-rectifier, and the base mount. This cable portion is isolated on either side of the continuous power supply cable by two tank circuits or isolation circuits which make it possible to limit the propagation of guided waves solely over the length of the continuous power supply cable. Thus, the high-frequency HF signals are not transmitted on the mains (see column 5 lines 50 to 55). The continuous current flowing on the continuous power supply cable passes through these isolation circuits, while a capacitive coupling allows antenna linking with the continuous power supply cable.

Patent application EP 0 718 908 describes a nomadic radiofrequency transmitter in which the metal housing of the power supply cell is used as antenna. Each pole of the cell is connected to a power supply terminal of the transmitter by a conductor equipped with an HF blocking inductor. One of the poles of the cell is moreover linked to the HF output of the transmitter circuit by an impedance matching circuit, favoring the maximum transfer of signal power between the HF output and the antenna consisting of the cell. The power supply current of the transmitter does not pass through this matching circuit. The device requires a significant number of HF blocking inductors.

The devices of the prior art therefore often require an intervention on a power supply cable, so as to make it possible to isolate a part thereof for the HF, or so as to allow a predetermined coupling in terms of length (inductive coupling) or position (capacitive coupling). This therefore forces the use of a specific power supply cable. Other devices, not described, envisage a coupling with the earth cable when it exists, but the results are highly random.

Despite the progress achieved by the Applicant's device described in U.S. Pat. No. 7,151,464, it has been noted that the sensitivity remains dependent on the conditions of electrical installation, this being readily understood, but also that the sensitivity is dependent on the conditions of use of the actuator.

For example, good sensitivity during simple listening of the receiver degrades when the actuator is activated following a command received.

Such effects are not ascribable simply to the interference created by the electric motor of the actuator when it operates. It follows from this that the sensitivity of a motion command receiver degrades when the actuator is activated: there is therefore a risk of the priority commands such as an emergency stop command being picked up less well than commands for setting into motion.

SUMMARY OF THE INVENTION

The aim of the invention is to provide a radiofrequency transmission and/or reception device remedying these drawbacks and improving the radiofrequency devices known from the prior art. In particular, the invention proposes a device which spectacularly remedies the drawbacks of low sensitivity especially when it is accommodated in an actuator of tubular type, comprising an electric motor for driving a mobile home-automation element, and particularly when the actuator is mounted in a metal tube surrounding it. The invention proposes in particular a radiofrequency device of very simple structure.

The radiofrequency device according to the invention is defined by claim 1.

Various embodiments of the radiofrequency device according to the invention are defined by claims 2 to 10.

The home-automation device according to the invention is defined by claim 11.

Another embodiment of the home-automation device according to the invention is defined by claim 12.

BRIEF DESCRIPTION OF THE DRAWINGS

The invention will be better understood on reading the description which follows, given solely by way of example while referring to the appended drawings in which:

FIG. 1 is a diagram of a home-automation installation comprising a radiofrequency device according to the invention;

FIG. 2 is a diagram of a home-automation actuator comprising a first embodiment of a radiofrequency device according to the invention;

FIG. 3 is a diagram of a second embodiment of a radiofrequency device according to the invention;

DESCRIPTION OF THE PREFERRED EMBODIMENTS

Figure 4:
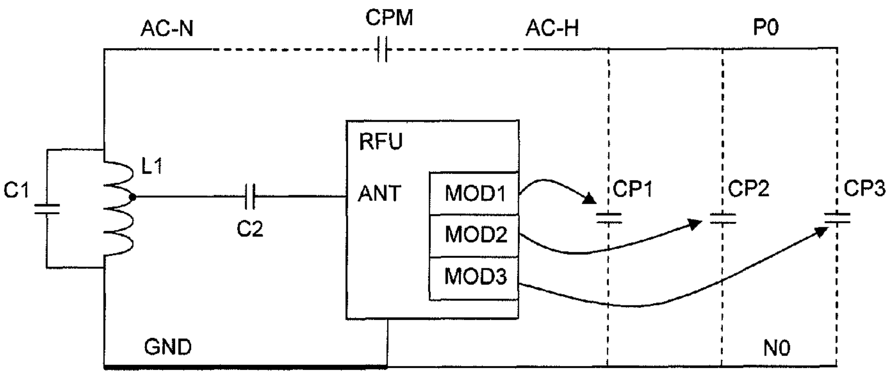
FIG. 4 is a diagram explaining why the radiofrequency device according to the invention is insensitive to the strength of the current drawn from the mains.

FIG. 1 represents a home-automation installation 10 comprising a command transmitter 1. This command transmitter comprises a control keypad 2 and a radiofrequency device 3, such as a radiofrequency transmitter here represented by a symbol of an antenna.

The command transmitter communicates by radiofrequencies with an actuator 4, comprising a radiofrequency device 30 such as a radiofrequency-based command receiver and a motor represented by its mechanical output 6 which is also the output member of the actuator. The radiofrequency device 30 receives the commands transmitted by the radiofrequency transmitter and transforms them if necessary into control commands for the motor. As represented in FIG. 2, the radiofrequency device comprises a tuning circuit 17 and a radiofrequency unit 11. The output of the actuator is connected to a movable element 7 that can move in a first direction DIR1 or in a second direction DIR2 depending on the command applied to the motor. The movable element 7 is installed in a building or its environs, for example a roller blind, a terrace shutter, a garage door or a gate and moves in a space 8 of the building, for example in front of a bay.

The actuator is supplied from the mains 9, that is to say the commercial AC network, for example 230 V, 50 Hz.

The control keypad comprises control keys. Depending on which key is pressed by the user, the radiofrequency transmitter transmits: a command to move in the first direction, a command to move in the second direction, a stop command.

The actuator is furnished with electromechanical or electronic devices, not represented, which make it possible to stop the motor automatically when the movable element arrives at the end of its trajectory in the space 8, for example at the top end-of-travel and at the bottom end-of-travel if dealing with a roller blind.

The transmitter may alternatively be intended to control a device for lighting, heating/air-conditioning or ventilation, an alarm siren, a multimedia projection screen or any device ensuring comfort, energy management and/or security in a building or its environs (gate, garden lighting, etc.). In this case, the actuator is a lighting, heating/air-conditioning, alarm actuator, etc.

Preferably, the command transmitter and the command receiver are of bidirectional type for exchanging information relating to the proper reception or proper execution of the commands received.

The installation can comprise several command transmitters and/or actuators communicating over one and the same radiofrequency network with use of a common protocol and of identification means.

Meteorological detection sensors or air presence or quality sensors or alarm sensors are also installable on the radiofrequency network and can be regarded here as command transmitters, even if they send measurement data only.

The invention will be described in the case of an actuator supplied by the mains, but it also applies to a command transmitter or to a sensor if the latter has a power supply from the mains, as represented in FIG. 1 by a dashed line joining the mains 9 to the command transmitter 1.

FIG. 2 represents an actuator 4 connected to the mains by a phase conductor 9*a* and by a neutral conductor 9*b*, also referenced AC-H and AC-N. The cable comprises a protection conductor 9*c* linked to the earth and to the metal casing of the actuator. This protection conductor is irrelevant in the case of a double-isolation actuator.

The actuator 4 is equipped with a first embodiment of a radiofrequency device 30 according to the invention. As will be described later, this radiofrequency device allows a point-like link with the mains, that is to say without any constraint on positioning along the mains power supply cable as a function of wavelength and without any constraint on HF isolation of a part of the mains power supply cable with respect to the remainder of the mains.

The radiofrequency unit 11 is either purely a receiver, or of bidirectional type, with an antenna input ANT and a control signals output OUT. The radiofrequency unit comprises elements, not represented, known to the person skilled in the art such as a power supply device, an amplifier-demodulator HF circuit, a micro-controller. Therefore, the radiofrequency unit is able to receive, to decode control commands and optionally to transmit information on the state of the actuator.

The control commands give rise to control signals sent by a control line 12 from the control signals output OUT to an input IN of a switching unit 13 connected to an electrical load 14, consisting of a motor MOT. The switching unit is connected on the one hand to the electrical mains by an internal phase line 15, denoted P0, and by an internal neutral line 16, denoted N0, and is connected on the other hand to the motor whose output 6 drives the movable element when the motor is supplied.

In the case where the motor is of the single-phase induction type, comprising a first motor terminal P1, a second motor terminal P2 and a third motor terminal N1, the switching unit may simply consist of relays making it possible to connect the internal phase line P0 either to the first motor terminal P1 or to the second motor terminal P2 depending on the desired direction of motion, while connecting the third motor terminal N1 to the internal neutral line N0.

In the case where the motor is of self-driven synchronous or brushless type, the switching unit comprises a rectifier followed for example by a three-phase inverter whose three outputs are connected to the three motor terminals. The rectifier can also be dissociated from the switching unit.

In the case where the motor is of DC type with commutator and brushes, the third motor terminal does not exist. The switching unit comprises a rectifier whose two output terminals are connected by relay either to the first motor terminal P1 and to the second motor terminal P2, or by inverting these two terminals, depending on the desired direction of rotation.

The internal phase line P0 is connected directly to the phase conductor 9*a*, while the internal neutral line N0 is connected to the neutral conductor 9*b* by way of the tuning circuit 17. The radiofrequency unit 11 comprises an electrical ground 18, denoted GND, which is connected, as closely as possible to the tuning circuit, to the internal neutral line N0. An example of closest possible connection is given in FIG. 5. The distance between the connection point and the tuning circuit is at least less, and preferably much less, than a quarter of a wavelength.

According to a first configuration, denoted TUN, the tuning circuit 17 comprises at least one winding L1 and one first capacitor C1, arranged in parallel and tuned to the HF frequency of the carrier used for the radiofrequency transmission.

An HF link 19, embodied with a second capacitor C2, makes it possible to connect the antenna input ANT of the radiofrequency unit 11 to a point of the winding L1. Everything happens as if the winding L1 were divided into two coupled windings placed in series, the HF link being connected to the common terminal of the two windings.

Figure 6:
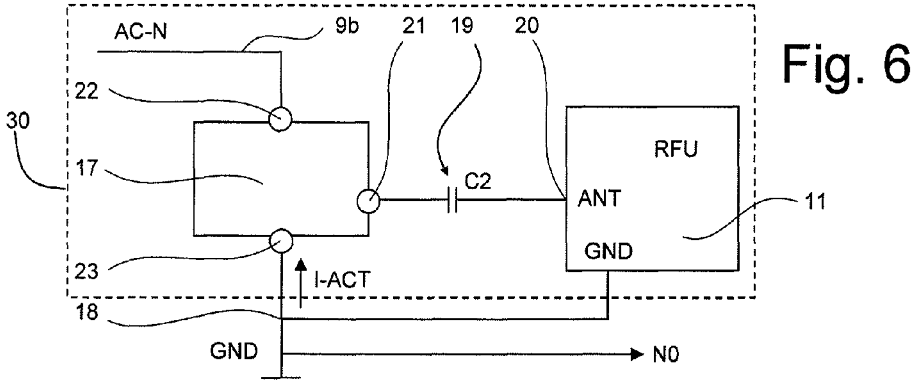
FIG. 6 is a diagram exhibiting in a general manner the structure of a radiofrequency device according to the invention.

The tuning circuit comprises three terminals referenced 21-23 which are detailed in the description of FIG. 6.

The radiofrequency unit is supplied from the mains voltage by a power supply input PS connected to the internal phase line P0 and by the electrical ground GND. The power supply device (not represented) internal to the radiofrequency unit, transforms the 230 V 50 Hz AC electrical voltage into an internal voltage, for example 3 V DC, which can be used as the power supply for the various electronic components situated in the radiofrequency unit and which is available between an internal power supply line VCC and the electrical ground GND.

It is therefore noted that the current I-ACT supplying the actuator, or actuator current, passes through the tuning circuit. This is a low-frequency (for example 50 Hz) AC current whose strength can vary depending on the mode of activity of the actuator. The radiofrequency component propagating on the mains cable is blocked by the parallel resonant circuit L1, C1 (or "tank circuit") contained in the tuning circuit. Conversely, on account of this topology allowing the AC power supply of the actuator through the tank circuit and placing the electrical ground GND as indicated, the HF radiofrequency component tapped off from the parallel resonant circuit is not disturbed by the consumption of the actuator.

FIG. 3 describes a second mode of embodiment of the radiofrequency device 30'. In this second mode, the tuning circuit 17' (denoted TUN*) comprises a third capacitor C3 and a fourth capacitor C4 arranged in series and replacing the capacitor C1. This time, it is the common point of these two capacitors which is used for the HF link 19, embodied by the second capacitor C2, to the antenna input ANT of the radiofrequency unit 11. Once again, the radiofrequency unit 11 comprises the electrical ground GND which is connected, as close as possible to the tuning circuit, to the internal neutral line N0. This second configuration is easier to embody since an inductor L2 consisting of a wire winding is arranged in parallel with the capacitors C3 and C4, avoiding the need to insert an intermediate plug.

Other configurations of the tuning circuit are conceivable within the framework of the invention, provided that the actuator current I-ACT can pass directly through it and that it blocks the passage of radiofrequency currents within the actuator current.

The strength of the current I-ACT can vary depending on the mode of activity of the actuator. Three modes of activity are for example assumed, depending on the state of the radiofrequency unit and depending on the control signals that it applies to the switching unit.

A first mode MOD1 corresponds to a standby mode of the radiofrequency unit, in which there is simply monitoring of the level picked up on the antenna input, for example at the output of a preamplifier comprising a signal level indicator, so as to be able to activate the other elements of the radiofrequency unit if a certain HF signal threshold is exceeded.

In this first standby mode, only few components are physically connected to the internal phase wire and to the internal neutral wire and the strength I1 of the current I-ACT is low. The equivalent capacitance exhibited by the components activated in this first mode of activity is called CP1.

A second mode MOD2 corresponds to a working mode of the radiofrequency unit, in which all its elements are activated for the reception, the decoding or coding and the interpretation of a radiofrequency signal detected in the standby mode. All the elements of the radiofrequency unit are physically connected to the internal phase wire and to the internal neutral wire, or supplied by way of these latter, and the strength I2 of the current I-ACT is greater than in the previous case, for example 5 times higher. The same holds for the value CP2 of the equivalent capacitance exhibited by the components activated in this second mode of activity.

A third mode MOD3 corresponds to the previous working mode of the radiofrequency unit, to which is added the activation of the switching unit and the power supply of the motor, or of any other electrical load operated by the switching unit. This time, the strength I3 of the current I-ACT is at its nominal value, for example 1000 times greater than the previous case. The same holds for the value CP3 of the equivalent capacitance exhibited by the components activated in this third mode of activity.

Represented in FIG. 4 is a simplified diagram equivalent to the operation of the invention according to the mode of activity. This diagram can explain the excellent performance of the topology used in the invention as regards its robustness in relation to the very significant modifications of the actuator power supply conditions. The tuning circuit represented is in its first configuration TUN.

It is noted that, according to the mode of activity, the capacitor C1 is disturbed by the placing in parallel of a capacitive assembly constituted by placing the mains stray capacitance CPM, seen between phase conductor AC-H and neutral conductor AC-N, in series with the equivalent capacitance CP1 or CP2 or CP3 of the mode of activity considered.

The mains stray capacitance CPM depends in part on the wire structure of the cable bringing the conductors AC-H and AC-N, but depends essentially on the layout of the tracks AC-H and AC-N on the printed circuit as represented later in FIG. 5.

This mains stray capacitance CPM is sometimes small compared with the three equivalent capacitances CP1 or CP2 or CP3. The capacitive assembly becomes substantially equivalent to a single capacitance CPM. It therefore suffices that CPM is also small, compared with the capacitance value chosen by the designer for the first capacitor C1, so that the coupling with the mains becomes independent of the latter and of the conditions of use of the actuator.

By way of example, we choose C1=4.7 pF (partially adjustable). Although low, the capacitance of the first capacitor C1 remains high compared with the stray capacitance of the network CPM. The designer deduces therefrom the inductance value L1 allowing the circuit L1-C1 to resonate in the chosen frequency range, for example L1=47 nH in order to work in a 400-MHz range. The capacitance value of the second capacitor C2 is determined, not only to ensure the HF link 19, but also so as to match the impedance seen by the antenna input to the advocated value, for example 50 ohms. We take for example C2=100 pF.

It should be noted that the role of the second capacitor C2 is then to allow impedance matching, and not the decoupling of the potentials of the coupling point and of the ground since the coupling point is almost at the ground potential. Certain choices of the assembly L1-C1 can avoid the second capacitor C2, the HF link 19 being ensured simply by a conducting wire.

Choosing a much higher capacitance for the first capacitor C1 would seem to be beneficial in that it is an even better guarantee of the insensitivity of the setup with respect to the possible variations of the stray capacitance of the network CPM. However, it leads to an even lower value of the inductor L1 for a determined frequency. Therefore, there is a risk that it will be hard to achieve mastery of L1. It has been noted by the inventor that the values indicated here give excellent results for a frequency of 433 MHz. For a higher frequency, for example 868 MHz, values such as 2 pF and 22 nH also give excellent results.

Figure 5:
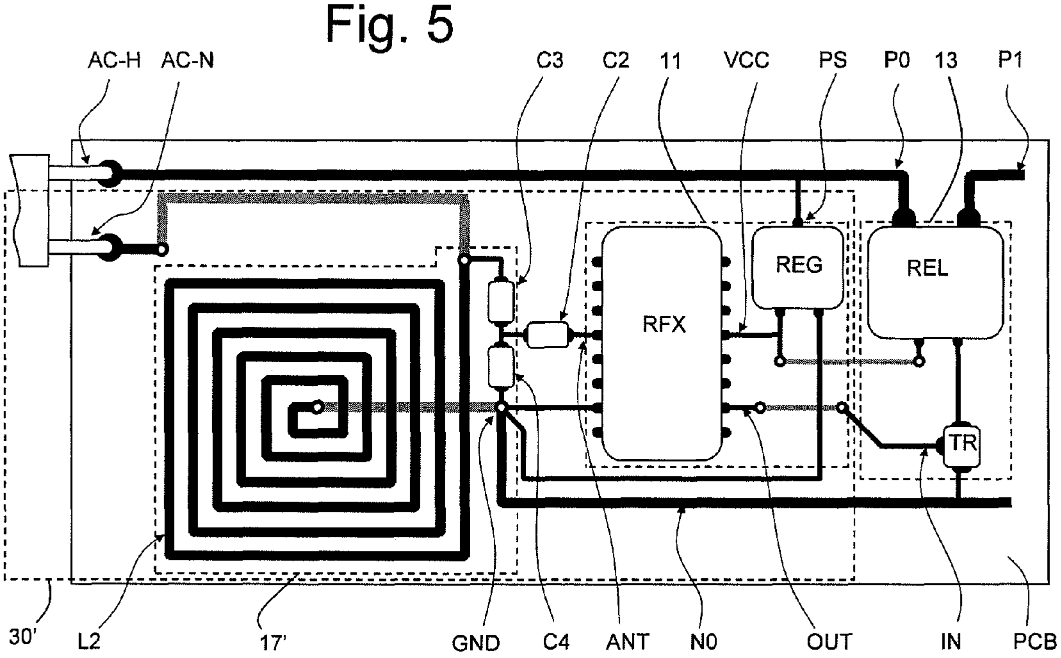
FIG. 5 is a partial view from above of a printed-circuit-based layout of the second embodiment of a radiofrequency device according to the invention.

FIG. 5 represents for illustration the case of a layout of a radiofrequency device on a double-sided printed board PCB, the upper face of which can be seen.

This illustration reuses the notation of FIG. 2, but with the second embodiment of the radiofrequency unit 30', comprising the second configuration TUN* of the tuning circuit.

In this simplified illustration, it has been assumed that the actuator is intended for the control of a simple load, for example an electric light bulb. Therefore, the switching unit comprises only a unipolar relay REL and its activation transistor TR. The main contacts of the relay are in the upper part, while the power supply contacts of its control coil are in the bottom part.

The output cable, not represented, is on the one hand connected to a track connected to the main output contact of the relay, equivalent to the line P1 of FIG. 2, and on the other hand it is connected directly to the internal neutral line N0.

The radiofrequency unit comprises a power supply circuit REG and a radiofrequency circuit RFX, for example bidirectional, that is to say comprising all the elements necessary for receiving and transmitting radiofrequency signals on an antenna input ANT. As explained, this circuit also comprises a micro-controller. The power supply circuit comprises an internal power supply line VCC which supplies the radiofrequency circuit, and which also supplies the relay REL when the transistor TR is conducting.

The tuning circuit is that of the second configuration. The inductor L2 is embodied in the form of a winding with printed turns. In FIG. 5, the number of turns is relatively high and corresponds to a frequency of the order of 100 MHz. There would be two to three times fewer turns for a frequency of 433 MHz.

A first end of the inductor L2 is connected to the neutral conductor AC-N of the mains cable. The phase conductor AC-H of the mains cable is linked to a track connected to the power supply circuit and to a main contact of the relay REL. This track is equivalent to the internal phase P0 of FIG. 2. Precautions are taken as regards the isolation distances between tracks respectively at the potentials of the two mains conductors.

The tuning circuit comprises the third capacitor C3 and the fourth capacitor C4, arranged in series with a common point to which the second capacitor C2 is connected, also connected to the antenna input of the radiofrequency circuit.

The inductor L2 is defined between the points connecting the printed turns with each free end of the third and fourth capacitors.

The electrical ground GND is taken immediately at the point connecting the fourth capacitor C4 and the inductor L2. It is essential that the electrical ground of the radiofrequency circuit and of the power supply circuit are also connected at this point to obtain the best results, at least in this type of simplified configuration, with no ground plane. It is known that the person skilled in the art resorts to a ground plane for such printed circuits, generally comprising more than two layers.

On the other hand, still in the case of FIG. 5, other components which are non-critical at the radiofrequency level can be connected at other points to any track connected to the electrical ground GND. For example, the transistor TR allowing power to be supplied to the relay control coil has its collector (upper terminal) linked to the relay, its base (intermediate terminal) linked to an output OUT of the radiofrequency circuit, and its emitter (lower terminal) linked directly to a track equivalent to the internal neutral line N0 of FIG. 2. The base of the transistor TR is equivalent to the input IN of the switching unit of FIG. 2.

Very obviously, the width of the tracks constituting the inductor L2 is dimensioned in a manner such that the nominal intensity of the actuator current I-ACT, for example 2 amperes, can flow therein without any problem. This dimensioning constraint is however beneficial insofar as it compels a very low stray resistance, and therefore a very good quality factor for the resonant circuit. If the inductor L2 is embodied using a wire winding, a wire diameter satisfying the same requirements is likewise taken.

FIG. 6 describes in complete generality the topology of the link between the radiofrequency unit 11 and the tuning circuit 17, on the one hand through the HF link 19 joining a radiofrequency signal input or output 20, constituting its antenna input ANT, to a first terminal 21 of the tuning circuit 17. The tuning circuit is connected by a second terminal 22 to one of the conductors 9*b* of the AC mains 9, connected by a third terminal 23 to an electrical ground (GND) of the radiofrequency unit able to block the conduction of radiofrequency signals between the second terminal and the third terminal and traversed between the second terminal and the third terminal by the AC current (I-ACT) supplying the device. The connection of the third terminal 23 to the electrical ground must be effective for the radiofrequency signals, that is to say it can be achieved: either in a direct manner, through a conducting wire, or through a capacitive link of zero or very low impedance at the frequency considered.

The various embodiments are therefore distinguished by the nature of the tuning circuit and of the tapping off of the signal on this tuning circuit and by the nature of the ground connection of said circuit, but all have in common that the tuning circuit is traversed by the electrical current supplying the electrical load controlled by the device.

Figure 7:
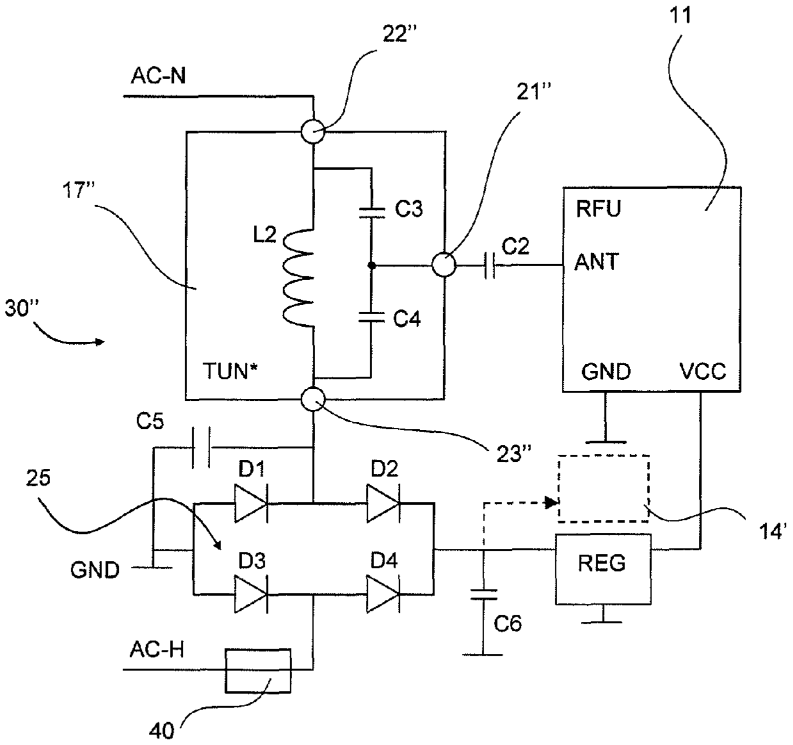
FIG. 7 is an electrical diagram of a third embodiment.

FIG. 7 thus describes a third embodiment of the invention in the case where a rectifier 25 with diode bridge D1-D4 is used in a power supply circuit of the radiofrequency unit 11. The common anodes of the diodes are connected to a first end of a filtering capacitor C6 connected to ground by its second end and to the input of a regulator whose output is connected to a positive power supply terminal VCC of the radiofrequency unit while the common terminal of the regulator is connected to ground GND. A tuning circuit 17", identical to the tuning circuit 17' of FIG. 3, comprises three terminals 21"-23" respectively identical to the three terminals 21'-23' of the latter circuit.

In this third embodiment, a fifth capacitor C5 establishes a capacitive link between the third terminal 23" of the tuning circuit and ground. For the radiofrequency signals, this capacitive link is equivalent to a conducting wire.

Alternatively, and all the more so the higher the frequency of the signals, the stray capacitance of the diode D1 can ensure the capacitive link without it being necessary to use an actual capacitor.

The tuning circuit 17" is traversed, between the second terminal and the third terminal, by the AC current flowing in the first conductor.

The rectifier 25 is also used to supply an electrical load such as a motor if the actuator contains an electrical load 14' such as a motor of brushless type or of DC type with commutator. The current of the load then flows in the tuning circuit.

A drawback of the setup of FIG. 7 is that the amplitude of the voltage on the third terminal reaches twice that of the AC mains. The voltage amplitudes across the terminals of the components of the tuning circuit being very low, almost this same amplitude is retrieved on the first terminal of the tuning circuit. This therefore demands the use of a second capacitor C2 able to support a high voltage, greater than 600V.

This voltage constraint is the same for the fifth capacitor C5. There is however a significant difference between the second capacitor C2 and the fifth capacitor C5.

Specifically, the exact capacitance value is of little significance for the latter, provided that it is large enough to be regarded as a short-circuit. Conversely, the value of the capacitance of the second capacitor C2 is fixed by the impedance matching constraint and requires a certain precision. However, there is only a very small standard choice of high-voltage capacitors for very small values of capacitance (a few tens of picofarads). The very limited choice of existing values then prevents good matching at a reasonable cost.

Figure 8:
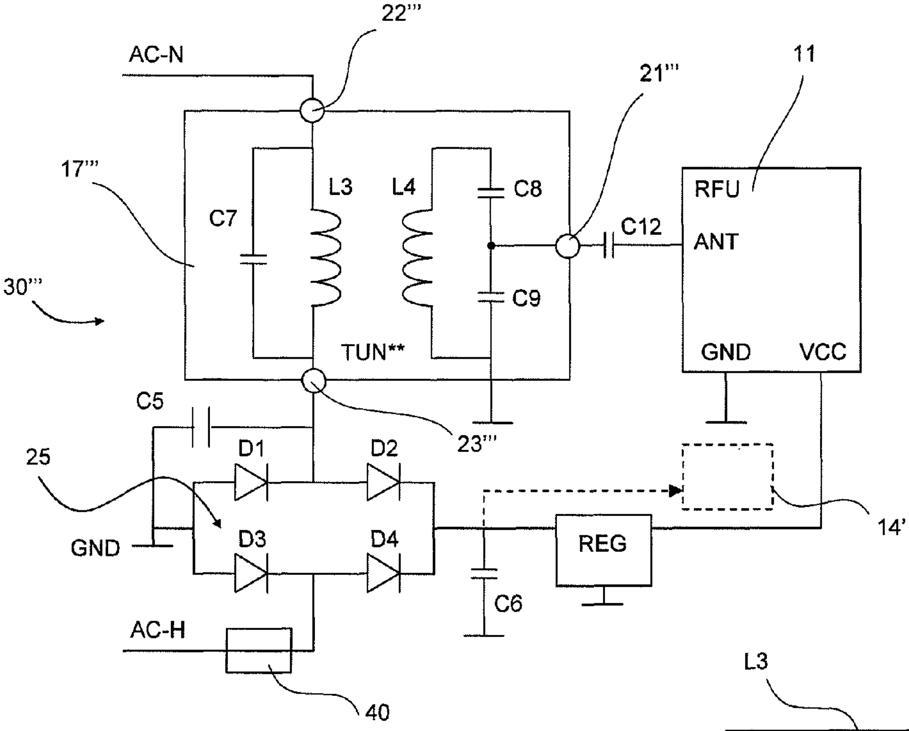
FIG. 8 is an electrical diagram of a fourth embodiment.

The fourth embodiment represented in FIG. 8 makes it possible to remedy this drawback by using a tuning circuit 17''' (denoted TUN) and still comprising a first terminal 21''' connected to a radiofrequency signal input of the radiofrequency unit by an HF link ensured by the second capacitor C2, a second terminal 22''' connected to the first conductor AC-N of the AC mains and a third terminal linked, by capacitive link with the aid of a fifth capacitor C5**, to the ground GND of the radiofrequency circuit. The fifth capacitor acts as a conducting wire for the radiofrequency signals.

The tuning circuit comprises, between the second terminal and the third terminal, a seventh capacitor C7 in parallel with a third inductor L3. It is traversed between these terminals by the AC current flowing in the first conductor and it blocks the conduction of radiofrequency signals between these two terminals, for the tuning frequency of the tank circuit consisting of the seventh capacitor C7 and the third inductor L3.

The winding of the third inductor L3 is coupled with that of a fourth inductor L4. Preferably, these two inductors are made opposite one another on the two faces of a printed circuit, according to the same principle as the second inductor L2. The assembly of these two windings is therefore equivalent to a transformer. The secondary circuit of the transformer comprises an eighth capacitor C8 in series with a ninth capacitor C9, the assembly being likewise tuned to the frequency of the signals. The common point of these two capacitors serves as first terminal 21''' for the tuning circuit, this terminal being connected to the radiofrequency signal input of the radiofrequency unit.

Figure 9:
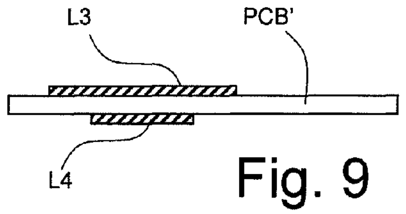
FIG. 9 is a partial schematic sectional view of a layout of the fourth embodiment based on a printed circuit.

FIG. 9 is a partial schematic sectional view of a layout of the fourth embodiment on a printed circuit PCB'.

The location of a first winding (concentric printed turns) forming the inductor L3, arranged on a first face of the printed circuit, and the location of a second winding forming the inductor L4 and arranged on the opposite face of the printed circuit, opposite the first winding, have been represented in hatched form. Preferably these windings are concentric. The two windings are thus coupled so as to form a transformer.

Even in this embodiment, the invention remains at least twice as simple to make as the systems of the prior art, especially by minimizing the number of inductors, the latter always being tricky to make and taking up significant room. In the worst case of FIG. 8, only two inductors are required, but they take up the room of just one as they are arranged on either side of the printed circuit.

As in the case of FIG. 7, the rectifier 25 is also used to supply an electrical load such as a motor if the actuator contains an electrical load 14' such as a motor of brushless type or of DC type with commutator. The current of the load then flows in the tuning circuit.

In the case where the stray capacitance of the network CPM is relatively significant, it may however be advantageous to also arrange an additional blocking circuit 40, of parallel LC tank circuit type, on the second mains conductor AC-H, as represented in FIGS. 7 and 8.

The invention has been represented while distinguishing between the neutral conductor and the phase conductor. Inverting these two conductors has no effect on the proper operation of the device. On the other hand, the principle of the invention avoids and prohibits the arranging, as encountered in the prior art documents, of a capacitor of large value at the frequencies considered (for example of capacitance greater than 500 pF) between the two input points of the neutral and phase conductors, so as to impose one and the same potential on them for the radiofrequencies. In FIG. 2, the position of such a capacitor 24 (denoted C15) has been represented by a dashed line. Specifically, such a choice leads to the replacing of CPM by C15 in FIG. 4, thereby giving an equivalent capacitance brought back in parallel with C1 depending strongly on the mode of activity and possibly of large value compared with C1, and therefore strongly influencing the tuning frequency.

The invention is therefore addressed at the case where radiofrequency RF signals are received or transmitted between the aerial medium and a radiofrequency unit supplied from the AC electrical mains, the latter playing the role of receiving or transmitting antenna of indeterminate length. It is particularly beneficial in a range of frequencies greater than 100 MHz. For any command transmitter or command receiver connected to the mains, it makes it possible to receive or to transmit commands sent by RF waves in aerial form by using as transmit or receive antenna an indeterminate part of a mains cable in the vicinity of the point of joining to the mains, doing so without being disturbed by the variability of the modes of activity of the command transmitter or of the command receiver.

Compared with the mains coupling setup previously used by the Applicant and described in the prior art, the invention allows a gain in sensitivity of 30 to 50% and above all makes it possible to obtain a perfectly isotropic sensitivity diagram, even for various configurations of the mains power supply cable. Moreover, the space saving for the largest dimension of the printed circuit (fixed by the requirements of inductive coupling) is greater than 5 cm.

Lastly, the invention exhibits a significant advantage in terms of protection against the stray overvoltages conveyed by the mains. When there is direct capacitive coupling of the antenna input of a radiofrequency unit with a mains conductor, as in certain devices of the prior art, this coupling conveys towards the radiofrequency unit the entirety of energy glitches at high frequencies. This results in the requirement for protection components.

The tuning circuit 17 itself allows protection at high frequencies: the capacitor C1 short-circuiting the whole of the tuning circuit, therefore also the common point between HF link and tuning circuit in the first configuration TUN, the capacitor C4 directly short-circuiting the common point between HF link and tuning circuit in the second configuration TUN* or likewise for the capacitor C9 in the third configuration TUN**.

The invention applies in a natural manner in the case where the radiofrequency unit is supplied by the AC mains by a power supply input PS. Alternatively, the radiofrequency unit is supplied in a separate manner, by a cell or else by an accumulator or a super-capacitor connected for example to a photovoltaic panel.

This type of separate power supply may for example be advantageous when all consumption on standby on the AC mains is prohibited.

The invention claimed is:

1. A radiofrequency device controlling means for supplying at least one electrical load and comprising a radiofrequency unit of radiofrequency signals transmitter and/or receiver type and connected by a first conductor to the AC mains, wherein the radiofrequency unit comprises a radiofrequency signal output and/or input connected by an HF link to a first terminal of a tuning circuit of the radiofrequency device, this tuning circuit being:

- connected by a second terminal to the first conductor,
- connected by a third terminal to an electrical ground of the radiofrequency unit,
- equipped with means for blocking the conduction of radiofrequency signals on the first conductor between the second terminal and the third terminal, and
- traversed between the second terminal and the third terminal by the AC current flowing in the first conductor and supplying said electrical load.

2. The radiofrequency device as claimed in claim 1, wherein the tuning circuit is connected by the third terminal to the electrical ground by direct link.

3. The radiofrequency device as claimed in claim 1, wherein the tuning circuit is connected by the third terminal to the electrical ground by capacitive link.

4. The radiofrequency device as claimed in claim 2, wherein the means for blocking the conduction of radiofrequency signals comprise, between the second and third terminals, a first winding mounted in parallel with a capacitor.

5. The radiofrequency device as claimed in claim 4, wherein the first terminal is connected: either directly between the two ends of the first winding, or to the common terminal of two capacitors arranged in series with a second winding coupled to the first winding so as to form a transformer.

6. The radiofrequency device as claimed in claim 2, wherein the means for blocking the conduction of radiofrequency signals comprise, between the second and third terminals, a winding mounted in parallel with two capacitors in series, the first terminal being connected to the terminal common to the two capacitors.

7. The radiofrequency device as claimed in claim 1, wherein the tuning circuit comprises a winding embodied in the form of printed turns.

8. The radiofrequency device as claimed in claim 1, wherein the radiofrequency signals have a frequency greater than 100 MHz.

9. The radiofrequency device as claimed in claim 1, wherein the radiofrequency unit is connected to a second conductor of the AC network and supplied by the AC network.

10. The radiofrequency device as claimed in claim 1, wherein the first and/or the second conductor of the AC mains constitutes a receiving or transmitting antenna of indeterminate length for the radiofrequency signals, the latter being of RF type and received and/or transmitted between the aerial medium and the radiofrequency unit via this antenna.

11. A home-automation device comprising at least one electrical load and ensuring a function of comfort, energy management and/or security in a building or its environs, which device comprises a radiofrequency device as claimed in claim 1, supplied by the first and second conductors and wherein said electrical load is supplied by a power supply current passing through the tuning circuit between the second and third terminals.

12. The home-automation device as claimed in claim 11, which device comprises several modes of activity, the power supply current passing through the tuning circuit between the second and third terminals being dependent on the mode of activity.

13. The radiofrequency device as claimed in claim 3, wherein the means for blocking the conduction of radiofrequency signals comprise, between the second and third terminals, a first winding mounted in parallel with a capacitor.

14. The radiofrequency device as claimed in claim 3, wherein the means for blocking the conduction of radiofrequency signals comprise, between the second and third terminals, a winding mounted in parallel with two capacitors in series, the first terminal being connected to the terminal common to the two capacitors.

* * * * *